United States Patent [19]
Lucki et al.

[11] Patent Number: 5,694,192
[45] Date of Patent: Dec. 2, 1997

[54] CLIP ON LENS ASSEMBLIES FOR EYEGLASSES

[75] Inventors: Siegfried Lucki, Frankfurt am Main; Ernst Spandl, Knittlingen, both of Germany

[73] Assignee: tlh-Design-Brillenfassungen GmbH, Fronhausen-Sichertshausen, Germany

[21] Appl. No.: 654,860

[22] Filed: May 29, 1996

[30] Foreign Application Priority Data

Jul. 13, 1995 [DE] Germany .................. 295 10 983 U

[51] Int. Cl.⁶ .................. G02C 9/00; G02C 5/00
[52] U.S. Cl. .................. 351/47; 351/154
[58] Field of Search .................. 351/44, 47, 83, 351/103–108, 109, 110, 154

[56] References Cited

U.S. PATENT DOCUMENTS

| | | | |
|---|---|---|---|
| 1,143,502 | 12/1915 | Burton | 351/154 |
| 1,620,569 | 3/1927 | Quick | 351/47 |
| 4,842,399 | 6/1989 | Tsai | 351/106 |
| 5,106,178 | 4/1992 | Akiyoshi | 351/57 |

FOREIGN PATENT DOCUMENTS

| | | |
|---|---|---|
| 381 177 B | 9/1986 | Austria . |
| 979220 | 4/1951 | France . |
| 1277375 | 10/1961 | France . |
| 2681441 | 3/1993 | France . |
| 812726 | 9/1951 | Germany . |
| 1790208 | 6/1959 | Germany . |
| 1800473 | 11/1959 | Germany . |
| 3148166 C1 | 6/1983 | Germany . |
| 3221644 | 12/1983 | Germany . |
| 37 18 794 C2 | 12/1988 | Germany . |
| 89 14 048 U1 | 3/1990 | Germany . |
| 42 14 413 A1 | 11/1993 | Germany . |
| 180729 | 4/1936 | Switzerland . |

*Primary Examiner*—Huy Mai
*Attorney, Agent, or Firm*—Chilton, Alix & Van Kirk

[57] ABSTRACT

An eyeglass attachment, for example a tinted lens, is provided with a circumferential groove which is engaged by a tension thread. A plurality of clips are mounted on the tension thread so as to be resiliently biased against the edge of the lens. The clips have outwardly extending arms with projections which engage the opposite sides of the frame of an eyeglass on which the tinted lens is to be installed.

20 Claims, 2 Drawing Sheets

CLIP ON LENS ASSEMBLIES FOR EYEGLASSES

BACKGROUND OF THE INVENTION

1. Field of the Invention

The present invention relates to facilitating the modification of prescription eyeglasses to compensate for differing light conditions. More particularly, this invention is directed to see-through attachments which may be readily fitted to eyeglasses and, especially, to improved clip-on tinted lens attachments for eyeglasses. Accordingly, the general objects of the present invention are to provide novel and improved methods and articles of such character.

2. Background of the Invention

Persons who wear glasses constantly face the problem that the ground clear lenses employed for indoor reading and working allow the passage of excessive light in the case of bright sunlight and/or highly reflective backgrounds. Such persons may be "blinded" by such excess light. Individuals who wear glasses at all times generally cannot use "normal", i.e., non-prescription, sunglasses since such normal sunglasses do not correct vision defects. A person who wears glasses, therefore, will typically carry two pair, i.e., the normal prescription glasses with no tint or a slight tint, and sunglasses with lenses ground to correspond to the normal glasses. It is often highly inconvenient to carry two pair of glasses. Further, it is inherently expensive to acquire two pair of prescription glasses, each including a frame and ground lenses.

The above-discussed problem is often addressed by eyeglass attachments, which include tinted lenses, designed for mounting over the lenses of normal glasses. Such attachments are relatively inexpensive since the lenses thereof do not have to be ground. A typical prior art eyeglass attachment of the type being described includes two lenses integrated into a frame which does not have the customary earpieces. The frame is provided with clips whereby it may be attached to the eyeglasses, i.e., the attachment is a so-called clip-on sunglass. Such attachments will have at least one bridge member interconnecting the frame portions which extend about the two tinted lenses. The distance between the lenses and the shape thereof are determined by the shape of the frame of the attachment, i.e., eyeglass attachments of the type being described cannot be adjusted to the shape of the user's glasses. This lack of ability to customize seriously diminishes the effectiveness of previously available clip-on sunglasses, i.e., the attachment lenses often only partially cover the eyeglass lenses or the attachment in part obstructs the eyeglass lenses. Further, such clip-on sunglasses effectively change the design of the user's glasses both because the shape of the attachment lenses differs from the shape of the eyeglass lenses and because clip-on sunglasses are generally attached very high upon the frame in order to increase the elasticity of the attachment whereby it may be used on a wide variety of eyeglass frames.

Clip-on sunglasses of the type discussed above are known wherein the clips by which the attachment lenses are coupled to the normal glasses are adhesively bonded to the periphery of the attachment lenses. In such case, the attachment lenses will nevertheless be connected to each other by a bridge and the above-briefly discussed disadvantages remain. Additionally, the adhesive bond between the clips and the attachment lenses is a major source of difficulty. Both the strength and the durability of such adhesive bonds is notoriously limited. For such an adhesive bond to be sufficiently strong, taking into account the fact that it is stressed by the repetitive installation and removal of the attachment lenses, large adhesive surfaces are necessary. Such large adhesive surfaces typically extend onto both sides of the attachment lens. Thus, eyeglass attachments wherein the clips are adhesively bonded to the lens are usually unsightly. In addition, the large connection areas often prove to be a source of annoyance to the user since they are inherently in the user's field of vision. Finally, even with large bonding areas, the life expectancy of such glued-on clips is limited since the bond is stressed, alternately in different directions, each time the clip-on sunglasses are put on and taken off.

SUMMARY OF THE INVENTION

The present invention overcomes the above-briefly discussed and other deficiencies and disadvantages of the prior art by providing a novel and improved eyeglass attachment which may easily be adjusted to any eyeglass shape. An eyeglass attachment in accordance with the invention employs an uncomplicated and reliable manner of mounting the clips of the attachment to the lenses of the attachment, such mounting requiring neither a mechanical fastener which requires an adjustment tool or an adhesive bond. The invention also encompasses a novel clip for removably attaching an attachment lens to an eyeglass frame or lens.

In accordance with the invention, each attachment lens is provided with a groove which extends completely about the lens in the edge region thereof. This circumferential groove is sized and shaped to receive an elongated resilient member, i.e., a tension thread. The clips of the present invention are engaged by, and thus retained on the attachment lens, by the tension thread. Thus, the tension thread firmly but elastically couples the clips to the outer edge of the attachment lens. The groove on the periphery of the attachment lens keeps the elastic tension thread from detaching from the lens. Because of the elasticity of the tension thread, it can easily be stretched to fit the attachment lens regardless of its shape. Accordingly, the attachment lenses can be formed by the optician to correspond to the shape of the eyeglass lenses. When the attachment lens is completed, the tension thread can be cut to length, the clips installed thereon and the tension thread and clips then installed on the attachment lens. Attachment lenses in accordance with the invention can thus be produced in an uncomplicated and flexible manner. The elasticity of the tension thread also makes it easy to install and remove the attachment lens, installation being facilitated by the fact that the clips are capable of pivotal motion. This ability of the clips to undergo pivotal motion enhances reliability since the forces exerted on the clips during installation and removal will damage neither the clips or the lens. The elasticity of the tension thread nevertheless affords an adequate mechanical bond between the clips and the attachment lens and the mechanical resistance of this connection is enhanced by any forces which cause stretching of the tension thread.

In the preferred embodiment of the invention, the tension thread receiving groove in the attachment lens extends over the entire circumference of the attachment lens. However, it is possible to practice the invention by providing tension thread receiving grooves only in the "corners" of the attachment lens.

Also in accordance with the preferred embodiment of the invention, the width and/or depth of the tension thread receiving groove in the attachment lens is determined by the diameter of the tension thread. The groove may be sized such that one half to all of the tension thread will be received therein. If the depth of the groove approximately equals the diameter of the tension thread, the tension thread will be reliably captured in the groove and will also be invisible from the front of the attachment lens.

Advantageously, in the practice of the present invention, the tension thread is comprised of Nylon or some other artificial fiber having similar physical characteristics. Nylon has been found to be a particularly desirable material since it is easy to work with, has sufficient elasticity and has high strength, i.e., mechanical resistance.

The clips employed in the practice of the present invention have a holding section, by which they are held in contact with the attachment lens, and a clip section by which they couple to the eyeglass frame or eyeglass lens in the case of "frameless" glasses.

One type of clip in accordance with the invention is provided with at least two holes, through which the tension thread extends, in the holding section. In that portion of the holding section disposed between these holes, the tension thread extends over and thus clamps the clip against the periphery of the attachment lens. Unwanted sliding motion of the clips is prevented by friction between the walls of the holes and the tension thread. The friction, i.e., the resistance against sliding, will be a function of the radii about which the tension thread is bent as it passes through the holes in the clip holding section, i.e., the smaller the radii, the greater the friction.

Also in accordance with the invention, the holding section of the clips may be provided with a groove on the side thereof which faces the attachment lens, the tension thread being in part received within this groove. The provision of such a groove will insure that the holding section of the clip directly contacts the periphery of the attachment lens, thereby increasing the support surface area of the clip on the attachment lens and enhancing the stability of the connection of the clip to the attachment lens.

The clip section of a clip in accordance with the present invention will include a pair of bridges, i.e., a pair of groove defining projections, spaced apart by a distance which roughly corresponding to the thickness of the eyeglass lens or frames with which the attachment of the invention is to be employed. These two bridges will, with the attachment installed, grip the eyeglass frame or the opposite sides of the eyeglass lens in the edge region thereof.

In order to ensure that the bridges of the clips do not interfere with the vision of the user, the height of the bridges is selected to generally correspond to the width of the eyeglass frame.

A clip in accordance with the present invention may have two spatially separated clip sections. Such a clip may be mounted on the attachment lens in a position such that the bridge of the eyeglass frame will pass between the two clip sections. Such an arrangement enhances the coupling of the attachment lens to the eyeglass and, particularly, ensures against relative motion therebetween. Typically, only one of the clips on each attachment lens will be of the type which has two clip sections.

A clip in accordance with the present invention may be comprised of metal or plastic and thus may be chosen to match the eyeglasses with which they eyeglass attachment of the invention will be employed.

In the practice of the present invention, it is advantageous to join together or otherwise capture the opposite ends of the tension thread in the region between a pair of holes in a clip. Such capturing, which may be accomplished by fusing the ends of the tension thread together, will prevent the tension thread from sliding out of the holding section of the clip. It should be noted, however, that threading the tension thread through several holes in a clip, especially if the bending radii of the thread as it passes through each hole is small, will reliably prevent the tension thread from sliding out of the holding section of the clip as a consequence of the friction created. Other means for capturing the opposite ends of the tension thread in a clip will be obvious to those skilled in the art.

As will also be obvious to those skilled in the art, the length of the tension thread will be selected such that it tightly engages the groove in the circumference of the attachment lens whereby the clips are also tightly attached to the attachment lens.

As noted above, a clip for use in an eyeglass attachment in accordance with the invention has a holding section, with at least two tension thread receiving holes, and at least one clip section having a pair of "bridges" spaced a predetermined distance, the bridge which is located closest to the holding section also being spaced therefrom by a predetermined distance. The holes permit the clip to be easily attached to an attachment lens by means of a tension thread, the thread running through the holes and the clip thereafter being resiliently urged against the periphery of the attachment lens at least over the portion thereof disposed between the thread-receiving holes. A clip in accordance with the invention also, as noted, may be configured such that the distance between the "bridges" corresponds to the thickness of the eyeglass frame or lens to which the attachment lens is to be attached.

A clip in accordance with the present invention may be provided with more than two tension-thread receiving holes, six such holes for example, and may have a pair of clip sections with eyeglass engaging edges. The end of a tension thread which is passed through three or more of the holes in such an alternative clip will be securely captured because of the resulting high level of friction between the thread and clip. Thus, by way of example, two free ends of a tension thread can be extended through three adjacent holes in a clip holding section and such ends will be securely captured by the friction created even without bonding the ends to one another. The extended length of the clip required to accommodate as many as six tension thread receiving holes in the holding section easily permits such a clip to have a pair of eyeglass engaging clip sections.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several figures and in which.

DESCRIPTION OF THE DISCLOSED EMBODIMENTS

Figure 1:
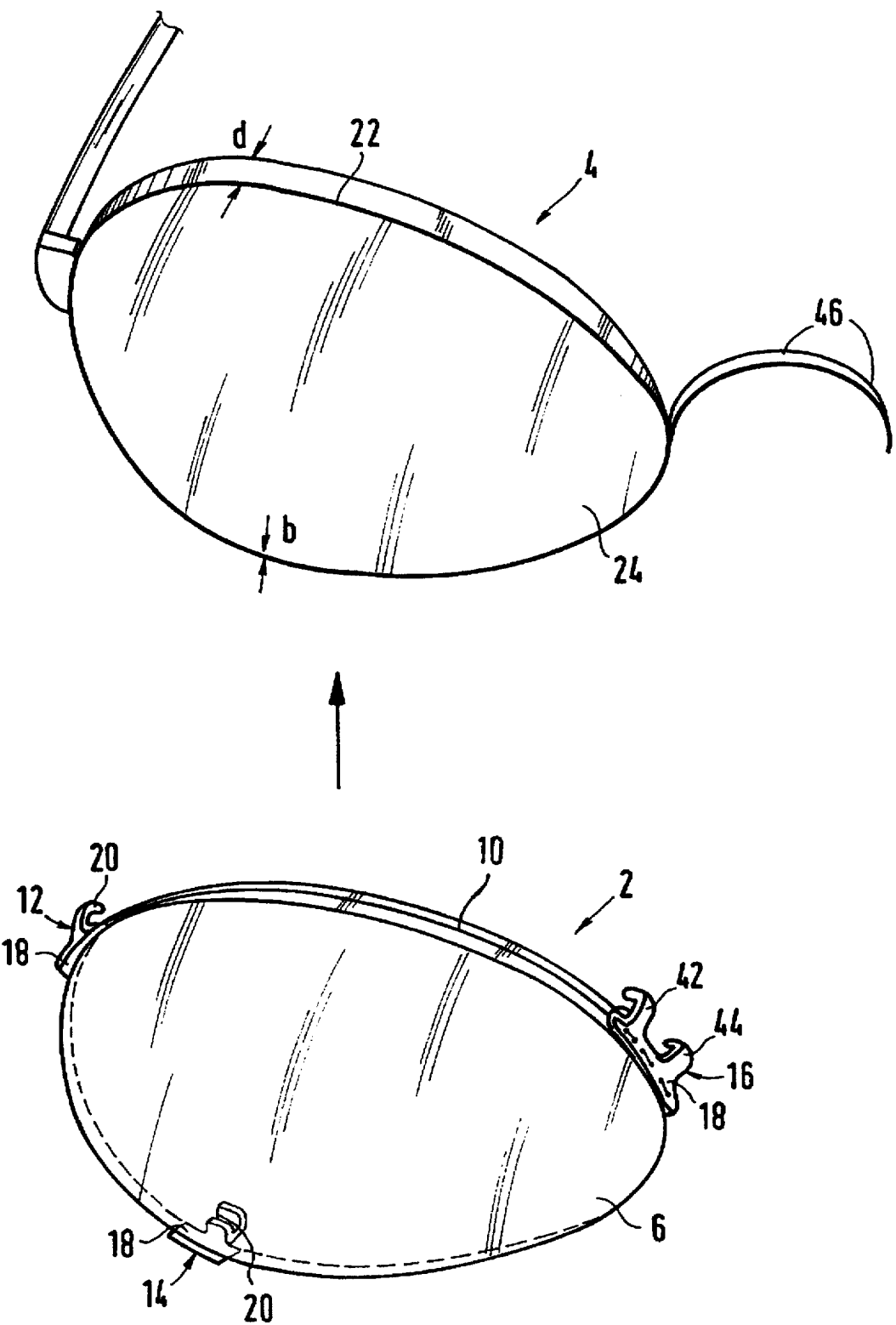
FIG. 1 is a perspective view of an attachment lens in accordance with the invention, the attachment lens being shown in spaced relationship to a portion of a pair of eyeglasses on which the attachment lens is to be installed.

With reference to the drawings, an eyeglass attachment in accordance with a first embodiment of the invention is indicated generally at 2. Eyeglass attachment 2 is intended for installation on a pair of eyeglasses which has been depicted partially and generally at 4. Eyeglass attachment 2 consists of an attachment lens 6, which will typically be a tinted, unground lens. In accordance with the invention, attachment lens 6 is provided with a peripheral groove 8 which may best be seen from FIG. 6. The groove 8 will typically extend completely about the circumference of lens 6 in the edge region thereof, i.e., in the portion of lens 6 which extends between the front and back, but may be provided only in the "corners" of lens 6. Groove 8 is sized and shaped to receive a tension thread 10. Tension thread 10 secures a plurality of clips, indicated generally at 12, 14 and 16, to lens 6. In the disclosed embodiment, clips 12 and 14 are of a first design, shown in FIGS. 2-4, while clip 16 is of a second design, shown in FIG. 5. As depicted in FIG. 6, the width of groove 8 corresponds to the diameter of tension thread 10 while the depth of groove 8 is at least equal to approximately the radius of thread 10. Groove 8 may, however, be sufficiently deep to fully accommodate tension thread 10 along all or a portion of its length.

Figure 2:
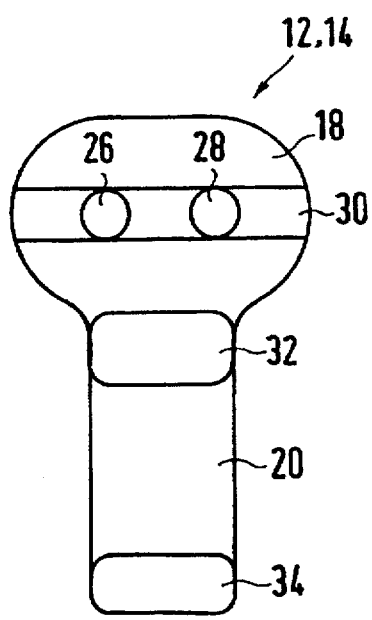
FIG. 2 is a front elevation view of a first embodiment of a clip for an eyeglass attachment in accordance with the invention.
Figure 3:
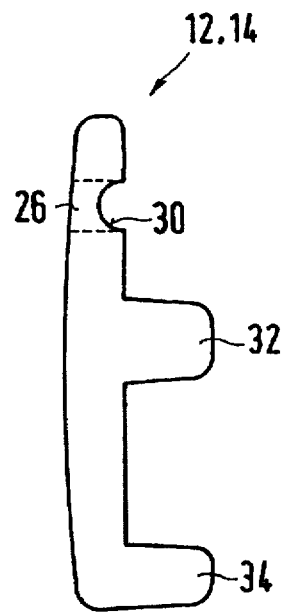
FIG. 3 is a side elevation view of the clip of FIG. 2.
Figure 4:
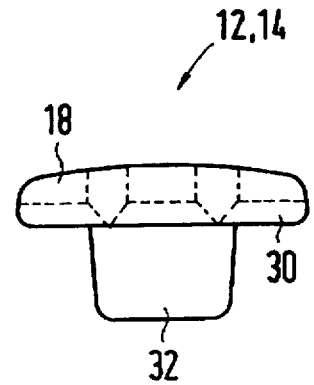
FIG. 4 is a top plan view of the clip of FIGS. 2 and 3.

Referring to FIGS. 2-4, the clips 12, 14 have a holding section 18 whereby the clip will be mounted on the attachment lens 6. The clips 12, 14 each also have a clip section 20. The combination of lens and clips defines an attachment which may be removably mounted on the eyeglass 4. The holding section 18 of the clips is provided with a pair of tension thread receiving holes 26, 28. These holes are in registration with a groove 30 provided in the side of the holding section 18 which faces the attachment lens 6. The groove 30 extends over the complete width of the holding section 18, is of semi-circular shape and has a width which roughly corresponds to the diameter of tension thread 10.

The clip section 20 of the clips 12, 14 has an outwardly extending arm from which "bridges" 32, 34 project. The bridges are generally parallel and are spaced apart by a distance which roughly corresponds to the thickness of (d) of eyeglass frame 22 (see FIGS. 1 and 6) or the eyeglass lens 24 if eyeglasses 4 are of the "frameless" type. The height of the bridges 32, 34 corresponds roughly to the width b of the eyeglass frame 22.

The clips 12, 14 and 16 will typically be fabricated from a material which is the same as or has the same appearance as the material comprising eyeglass frame 22. In the case of a plastic frame 22 or frameless lens 24, the clips 12, 14 and 16 will be comprised of plastic in order to ensure against damage to the frame 22 or the lens 24. In the case of plastic clips, the dimensions of the clip may be enlarged to increase the area of contact between the edge of the eyeglass frame or lens and the clip.

In order to mount the clips 12, 14 on the attachment lens 6, the tension thread 10 will be passed through hole 26, from the side of the hole which terminates in the groove 30, across the top of the clip and then back through the hole 28. As a consequence of the friction produced by the bending radii where the tension thread passes through the holes 26 and 28, the clip will be immobilized on the tension thread when it is pulled tight. The provision of the groove 30 ensures that the tension thread 10 will not interfere with the establishment of surface-to-surface contact between substantially the entire surface area of the holding section 18 of the clip which faces lens 6, with the exception of that portion of the clip encompassed by groove 30, and the outer edge of attachment lens 6. Accordingly, a very stable, albeit resilient, connection is established between the clip and attachment lens.

Figure 5:
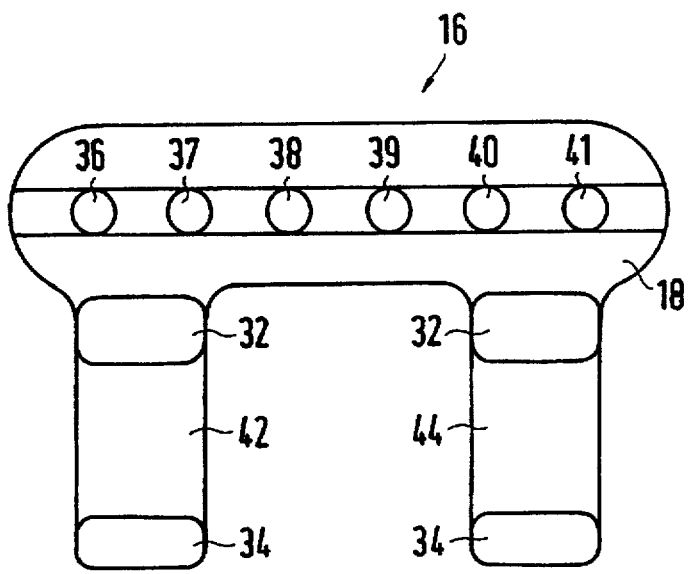
FIG. 5 is a front elevation view of a second embodiment of a clip for an eyeglass attachment in accordance with the invention.
Figure 6:
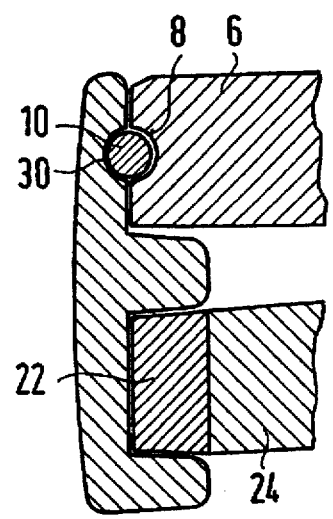
FIG. 6 is a schematic, cross-sectional view depicting a clip in accordance with the invention attached to an attachment lens and the combination installed on an eyeglass.

The alternative form of clip 16, as may be seen by joint consideration of FIGS. 1 and 5, basically corresponds to the above-described clips 12 and 14. However, clip 16 is wider than clips 12, 14 and is provided with six tension thread receiving holes 36–41. Clip 16 additionally has a pair of clip sections 42, 44 rather than a single clip section. Clip 16 is optimally employed to capture the opposite ends of tension thread 10. Thus, the ends of tension thread 10 are threaded through holes 36–41 so that the two loose ends are in abutting relationship in the region between the holes 38 and 39 on the side of clip 16 which faces attachment lens 6. The ends of the tension thread 10, which will typically be comprised of Nylon, can be fused together or compressed by fusion, so that they cannot slip back through the holes 38, 39. The length of tension thread will, of course, be chosen so that it will be under tension, i.e., elastic elongation, when snapped into the groove 8 on the attachment lens 6.

The eyeglass attachment 2, i.e., the attachment with the three clips mounted thereon, can be attached to glasses 4 simply by bending the clips 12, 14, 16 slightly outward against the elastic force of the tension thread 10 and then pushing the clip sections 20, 42 and 44 over the eyeglass frame 22. This will result in the attachment lens 6 being held basically slip-free on the glasses. Optimally, the clip 16 will be positioned such that the bridge 46 of the eyeglass frame 22 passes between the clip sections 42 and 44. Such an arrangement virtually eliminates the possibility of relative movement between attachment 2 and the underlying eyeglass lens.

The shape of the eyeglass attachment 2 will be matched to the eyeglass frame in such a way that the eyeglass lens 24 and the attachment lens 6 basically have the same coverage. Thus, the eyeglass attachment 2 can be produced, in an uncomplicated and inexpensive manner, for any shape eyeglasses. This uncomplicated and inexpensive manufacture is permitted by the fact that only the attachment lens 6 has to be specifically formed, i.e., the clips 12, 14 and 16 can be previously produced in various sizes and from various materials and chosen for use as a function of the eyeglass frame 22. Thus, the optician need merely form the lens 6, take the clips from stock, and cut the tension cord 10 from a roll and quickly assemble the combination.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An eyeglass attachment comprising:
    an attachment lens for installation on an existing eyeglass in registration with the lens of the eyeglass, said attachment lens having a pair of oppositely disposed sides and a circumferential edge region which extends between said sides, said attachment lens circumferential edge region being provided with a groove;
    an elongated elastic member extending around said circumferential edge region of said attachment lens, said elastic member being in tension and being received in said groove; and a plurality of clips, said clips being engaged by said elastic member whereby said clips are resiliently biased against said circumferential edge region of said attachment lens, said clips each having an eyeglass engagement portion spaced outwardly with respect to a first side of said attachment lens.

2. The eyeglass attachment of claim 1 wherein said groove is continuous and extends completely about said attachment lens.

3. The eyeglass attachment of claim 2 wherein said elastic member is a tension thread and wherein the width of said groove is generally complementary to the diameter of said tension thread.

4. The eyeglass attachment of claim 3 wherein said clips each comprise:

a holding section having a support surface which abuts said attachment lens circumferential edge region; and a clip section extending from said holding section, said clip section being in part sized and shaped to engage an eyeglass whereby said eyeglass attachment may be mechanically coupled to the eyeglass.

5. The eyeglass attachment of claim 4 wherein said holding section of each of said clips are provided with at least two through-holes, and wherein:

said tension thread extends through said through-holes.

6. The eyeglass attachment of claim 5 wherein said clip section of each of said clips includes an arm which extends outwardly from said holding section and a pair of projections extending from said arm, said projections being spaced by a distance which generally corresponds to the thickness of the portion of the eyeglass to be engaged by said clip section.

7. The eyeglass attachment of claim 1 wherein said attachment lens circumferential edge region has corner areas and wherein said groove is discontinuous and is provided only in said corner areas.

8. The eyeglass attachment of claim 1 wherein said elastic member is a tension thread and wherein the width of said groove is generally complementary to the diameter of said tension thread.

9. The eyeglass attachment of claim 1 wherein said elastic member is a tension thread comprised of an artificial fiber.

10. The eyeglass attachment of claim 1 wherein said clips each comprise:

a holding section having a support surface which abuts said attachment lens circumferential edge region; and a clip section extending from said holding section, said clip section being in part sized and shaped to engage an eyeglass whereby said eyeglass attachment may be mechanically coupled to the eyeglass.

11. The eyeglass attachment of claim 10 wherein said holding section of each of said clips are provided with at least two through-holes, and wherein:

said elongated elastic member is a tension thread which extends through said through-holes.

12. The eyeglass attachment of claim 11 wherein said holding section of each of said clips are further provided with a groove in said support surface, said groove in said support surface being in registration with said through-holes and said tension thread being in part received in said groove in said support surface.

13. The eyeglass attachment of claim 11 herein the opposite ends of the tension thread are passed through the through-holes in one of said clips and said ends are subsequently worked to prevent passage through said through-holes whereby said tension thread is permanently affixed to said clip.

14. The eyeglass attachment of claim 10 wherein said holding section of each of said clips are provided with at least six through-holes, and wherein:

said elongated elastic member is a tension thread which extends through said through-holes.

15. The eyeglass attachment of claim 10 wherein said clip section of each of said clips includes an arm which extends outwardly from said holding section and a pair of projections extending from said arm, said projections being spaced by a distance which generally corresponds to the thickness of the portion of the eyeglass to be engaged by said clip section.

16. The eyeglass attachment of claim 15 wherein the length of said projections corresponds generally to the width of the frame of the eyeglass on which said attachment is to be installed.

17. The eyeglass attachment of claim 10 wherein at least one of said clips is provided with a pair of said clip sections.

18. The eyeglass attachment of claim 1 wherein said clips are comprised of the same type of material as the portion of the eyeglass on which the said attachment is to be installed.

19. A clip for an eyeglass attachment comprising:

a holding section, said holding section being provided with at least a pair of through-holes; and a first clip section which is integral with and extends from said holding section, said first clip section having a pair of bridge members which extend outwardly in a direction which is generally parallel to the axis of said holes, said bridge members being separated by a predetermined space.

20. The clip of claim 19 wherein said holding section is provided with six through-holes, said through-holes being arranged in a linear array, and wherein said clip includes a second clip section which is identical to said first clip section.

* * * * *